United States Patent [19]

Peterson

[11] Patent Number: 5,451,022
[45] Date of Patent: Sep. 19, 1995

[54] MOUNTING BRACKET FOR A SUN VISOR

[75] Inventor: Don M. Peterson, Marlette, Mich.

[73] Assignee: Wayne State University, Detroit, Mich.

[21] Appl. No.: 199,824

[22] Filed: Feb. 22, 1994

[51] Int. Cl.[6] .............................................. B60J 3/00
[52] U.S. Cl. .............................. 248/289.11; 296/97.9
[58] Field of Search ................... 248/289.1, 288.1, 274; 296/97.9, 97.1, 97.13, 97.11, 97.12

[56] References Cited

U.S. PATENT DOCUMENTS

| | | |
|---|---|---|
| 2,357,974 | 9/1944 | Roberts . |
| 2,939,741 | 6/1960 | Keating et al. . |
| 3,017,217 | 1/1962 | Keating . |
| 4,023,856 | 5/1977 | DeRees . |
| 4,178,035 | 12/1979 | Cziptschirsch . |
| 4,377,020 | 3/1983 | Vigo . |
| 4,569,552 | 2/1986 | Marks . |
| 4,653,708 | 3/1987 | Rich . |
| 4,720,132 | 1/1988 | Ebert et al. . |
| 4,729,590 | 3/1988 | Adams . |
| 4,858,983 | 8/1989 | White et al. . |
| 4,888,072 | 12/1989 | Ohlenforst et al. . |
| 4,902,068 | 2/1990 | Dowd et al. . |
| 4,989,911 | 2/1991 | Van Order . |
| 5,031,954 | 7/1991 | Peterson et al. . |
| 5,044,685 | 9/1991 | Yang . |
| 5,054,839 | 10/1991 | White et al. . |
| 5,056,853 | 10/1991 | Van Order . |
| 5,061,005 | 10/1991 | Van Order et al. . |
| 5,062,608 | 11/1991 | Phelps et al. . |
| 5,082,322 | 1/1992 | Cekander et al. . |
| 5,082,323 | 1/1992 | Dowd et al. . |
| 5,098,151 | 3/1992 | Peterson . |
| 5,201,564 | 4/1993 | Price . |

FOREIGN PATENT DOCUMENTS 1251479  10/1971  United Kingdom .

Primary Examiner—David M. Purol
Attorney, Agent, or Firm—Brooks & Kushman

[57] ABSTRACT

An assembly is disclosed for mounting a sun visor to the roof of a motor vehicle. The assembly comprises a frame, an arm receiver, and a spring. The frame has an opening therethrough, a plurality of anchors disposed around the perimeter of the frame opening and adapted to engage the roof, and a plurality of stop tabs disposed around the perimeter of the frame opening. The arm receiver has an upper flange adapted to be inserted through the frame opening, a plurality of channels adapted to receive a corresponding stop tab, and a lower flange. The spring is disposed between the frame and the arm receiver so that upon insertion of the upper flange of the arm receiver through the frame opening and rotation of the arm receiver about a central axis, the rotation stop tabs enter their corresponding channels and are held therein to prevent the arm receiver from being withdrawn through the frame opening. An arm of the sun visor can thereafter be mounted to or removed from the arm receiver without the use of tools or fasteners.

14 Claims, 3 Drawing Sheets

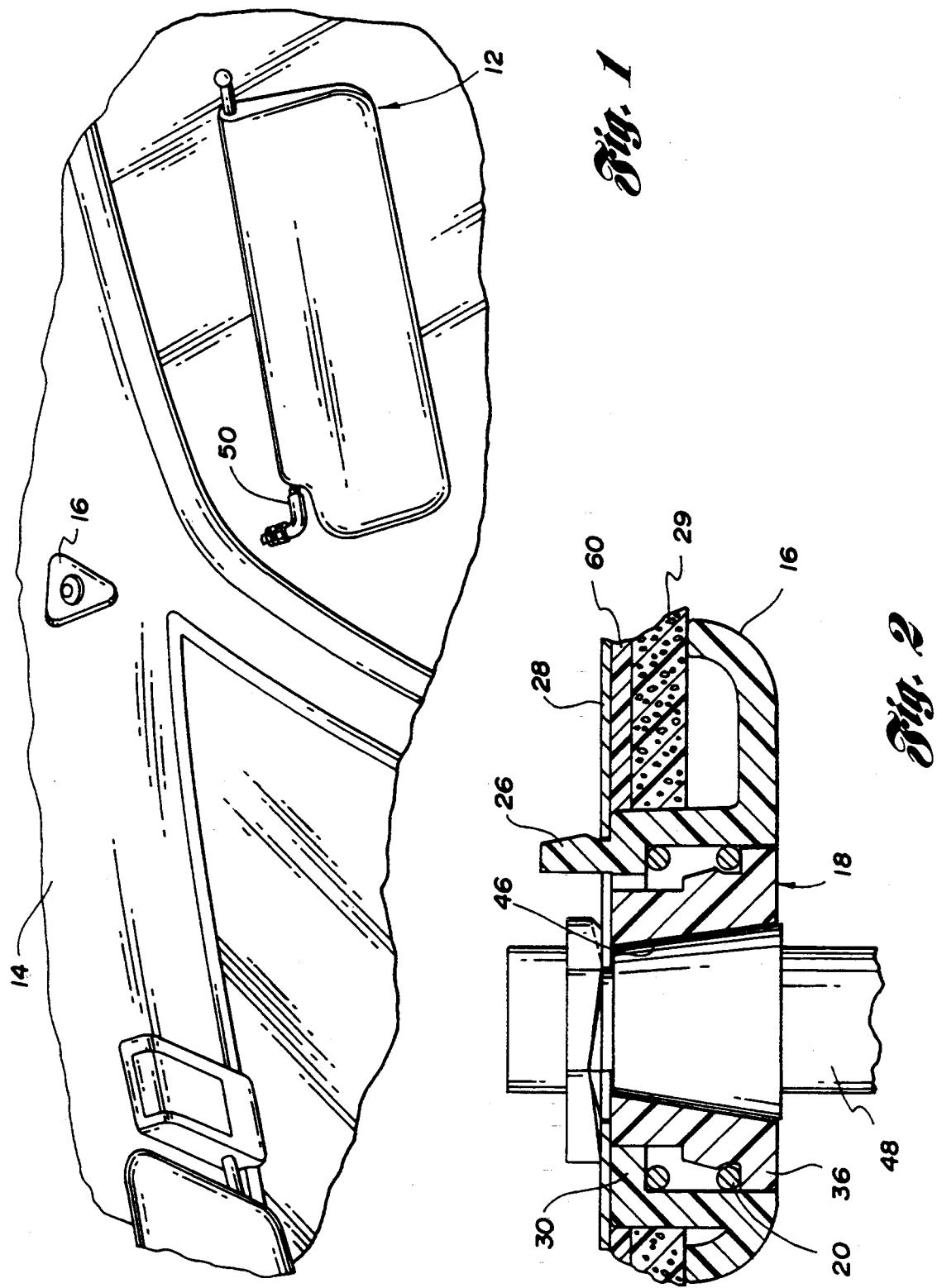

MOUNTING BRACKET FOR A SUN VISOR

TECHNICAL FIELD

This invention relates to sun visors for motor vehicles, and in particular to a mounting bracket assembly that allows a sun visor to be installed in and removed from the vehicle without the use of tools or fasteners.

BACKGROUND ART

Sun visors for motor vehicles are normally mounted to the roof of a motor vehicle by a bracket and arm assembly that allows the visor blade to pivot horizontally between a storage and a use position. Often, the mounting assembly also provides a vertical axis about which the visor blade may pivot between a position proximate the front windshield and a position proximate the driver's side or passenger's side window.

For example, my U.S Pat. No. 5,031,954 discloses a mounting bracket and arm assembly for a sunshade including an inner bracket having an integrally formed square boss that is inserted into a corresponding hole in the sheet metal roof of a vehicle. A bracket arm is snapped into the inner bracket, and includes a key that fits within an arcuate keyway in the inner bracket to initially lock the inner bracket in place, and thereafter limit the range of through which the sunshade may pivot about a vertical axis. However, a tool is required to remove the sunshade after it has been mounted.

SUMMARY OF THE INVENTION

The present invention is an assembly for mounting a sun visor to the roof of a motor vehicle. The assembly comprises a frame, an arm receiver, and a spring. The frame has an opening therethrough, at least one anchor disposed around the perimeter of the frame opening and adapted to engage the roof, and at least one stop tab disposed around the perimeter of the frame opening. The arm receiver has an upper flange adapted to be inserted through the frame opening, a channel adapted to receive the stop tab, and a lower flange. Finally, the spring is disposed between the frame and the arm receiver so that upon insertion of the upper flange of the arm receiver through the frame opening and rotation of the arm receiver about a central axis, the rotation stop tab enters the channel and is held therein to prevent the arm receiver from being withdrawn directly through the frame opening. An arm of the sun visor can be mounted to the arm receiver either before or after insertion of the arm receiver.

Accordingly, it is an object of the present invention to provide an assembly of the type described above which allows a sun visor to be mounted in and removed from a motor vehicle without the use of tools.

Another object of the present invention is to provide an assembly of the type described above that does not have a key and keyway arrangement limiting the horizontal sweep of the sun visor.

These and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a perspective view of a sun visor and assembly according to the present invention for mounting the sun visor to the roof of a motor vehicle;

FIG. 2 is a cross-sectional view of a frame and arm receiver of the assembly mounted to an inner sheet metal layer of the roof of the vehicle with an arm of the sun visor;

BEST MODE FOR CARRYING OUT THE INVENTION

Figure 3:
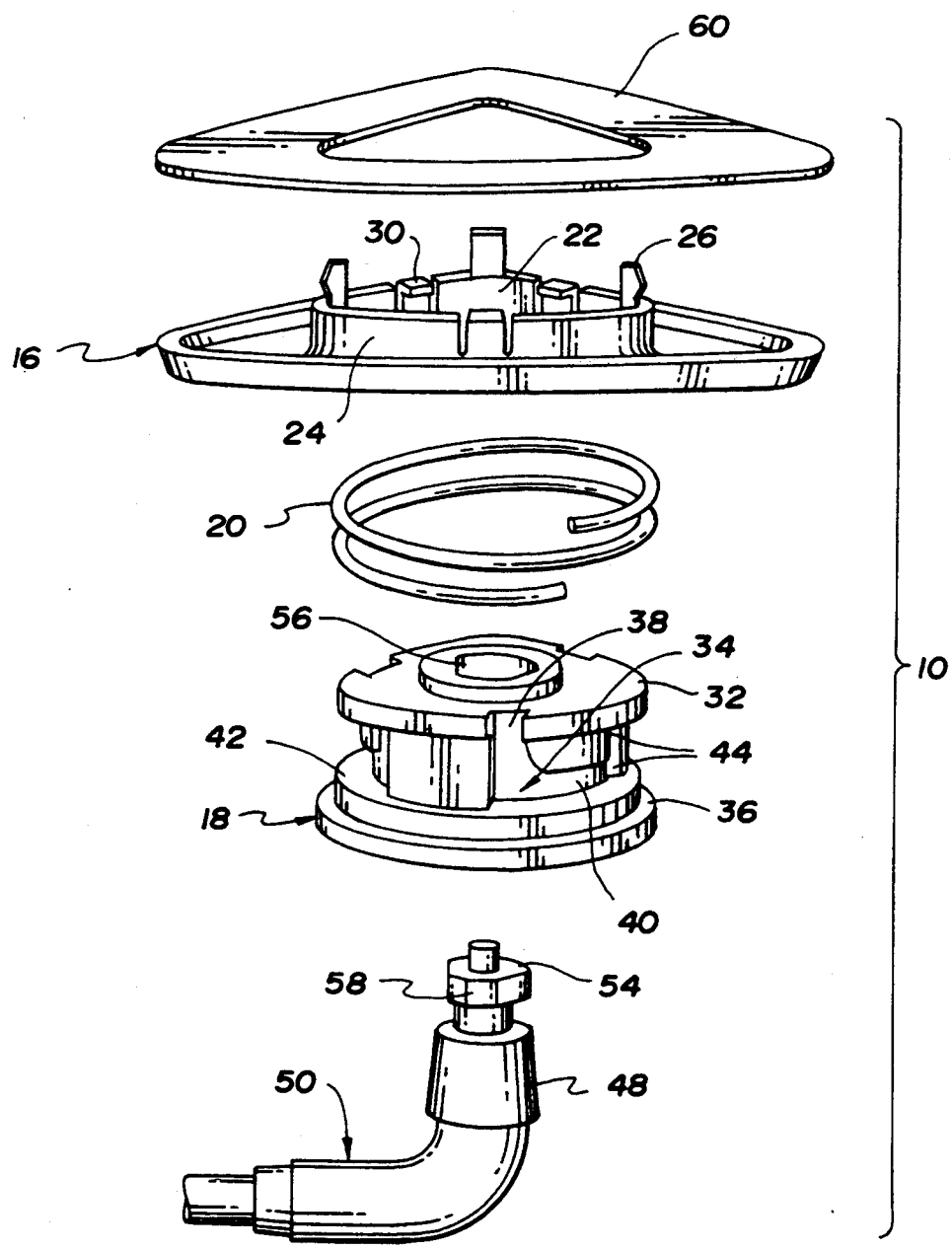
FIG. 3 is an exploded perspective view of the assembly and a portion of a visor mounting arm.

With reference to the drawings, the preferred embodiments of the present invention will be described. FIGS. 1 through 3 show an assembly 10 according to the present invention for mounting a sun visor 12 to the roof 14 of a motor vehicle. The assembly comprises a frame 16, an arm receiver 18, and a coil compression spring 20.

The frame 16 is preferably generally triangular, and has a coaxially aligned, generally triangular opening 22 therethrough defined by a raised inner perimeter 24. A plurality of anti-rotation anchors 26 are disposed around the perimeter 24 of the frame opening 22, preferably arranged with one anchor in each of the three corners of the perimeter. The anti-rotation anchors 26 project generally upwardly from the perimeter of the frame opening 22, and are adapted to engage with a snap fit the border of a matching triangular hole cut through the inner sheet metal 28 of the vehicle roof 14. Additionally, the anchors 26 serve as a means of holding a headliner 29 in place against the inner sheet metal 28. A plurality of rotation stop tabs 30 are similarly disposed around the perimeter 24 of the frame opening 22, preferably arranged with one stop tab in the middle of each of the three sides of the perimeter. The stop tabs 30 project into the frame opening 22 to cooperate with channels in the arm receiver 18, as described below.

The arm receiver 18 has an upper flange or sheet metal lock 32, a plurality of channels 34 formed therein, and a lower flange or spring seat 36. The upper flange 32 is sized and shaped closely to the frame opening 22 so as to just be insertable therethrough. The channels 34 each include a tab receiver portion 38 opening through the upper flange 32, a lateral groove portion 40 which is preferably partially defined by a middle flange 42, and a tab stop portion 44. Each channel 34 is adapted to receive a corresponding rotation stop tab 30 when the upper flange 32 is inserted through the frame opening 22.

The spring 20 is disposed between the frame 16 and the lower flange 36 of the arm receiver 18 to bias these components away from each other. Upon manual or other insertion of the upper flange 32 of the arm receiver through the frame opening 22 against the force of the spring 20, the rotation stop tabs 30 enter a corresponding and preferably aligned tab receiver portion 38. When the arm receiver 18 is thereafter rotated in a counterclockwise direction as viewed from below about a central axis extending generally perpendicular to the upper face of the upper flange 32, preferably about 60 degrees so that the three points of the upper flange 32 are exactly offset from the corners of the frame opening 22, the stop tabs 30 travel through the lateral groove portions 40 until they abut the tab stops 44. After the upward force compressing the spring 20 is relaxed, the stop tabs 30 are drawn upwardly in the tab stops 44 and held therein against the lower face of the upper flange 32 to prevent the arm receiver 18 from being withdrawn directly through the frame opening 22. However, the arm receiver can be removed from the roof of the vehicle by simply reversing the installation process, also without the aid of tools.

A bore 46 in the arm receiver 18 is provided to receive with an interference fit a shorter vertical arm 48 of a visor pivot rod 50 of the sun visor 12. An irregularly shaped knob 54 disposed at the upper end of the vertical arm 48 extends, when the visor arm is fully inserted into the bore 46, through a similarly shaped opening 56 and out the top of the arm receiver 18. The knob 54 is preferably formed in a modified "D" shape having a four flat sides 58 so that the arm can rotate against only the friction produced by the fit with the bore 46 through all 360 degrees of a full circle, or at least a significant portion of a full circle, without coming back to a point where the pivot rod 50 is at risk of falling out of the arm receiver 18.

Within this extended range of movement, only about 90 to 120 degrees need be allotted to permit the visor to swing between the practical limits of the front windshield and the driver's side or passenger's side window. Alternative means for retaining the arm 48 of the pivot rod 50 in the bore 46 can easily be substituted for this arrangement, such as the structure disclosed in my previous U.S. Pat. No. 5,031,954, the disclosure of which is hereby incorporated by reference.

An optional back plate 60 may be provided engaged with the anchors 26 of the frame 16 for shipment of the bracket subassembly, or for added rigidity when the frame is subassembled with the headliner 29 before installation into the vehicle. When the frame 16 is preassembled in this fashion, the arm receiver 18 and the visor pivot rod 50 may be separately assembled and installed into the visor as received by the customer before union with the frame. The back plate 60 is therefore preferably generally triangular in shape, and is formed from rigid plastic or cardboard. Typically, however, the back plate 60 is not necessary when the frame is installed into a vehicle to which the headliner has already been integrated.

Figure 4:
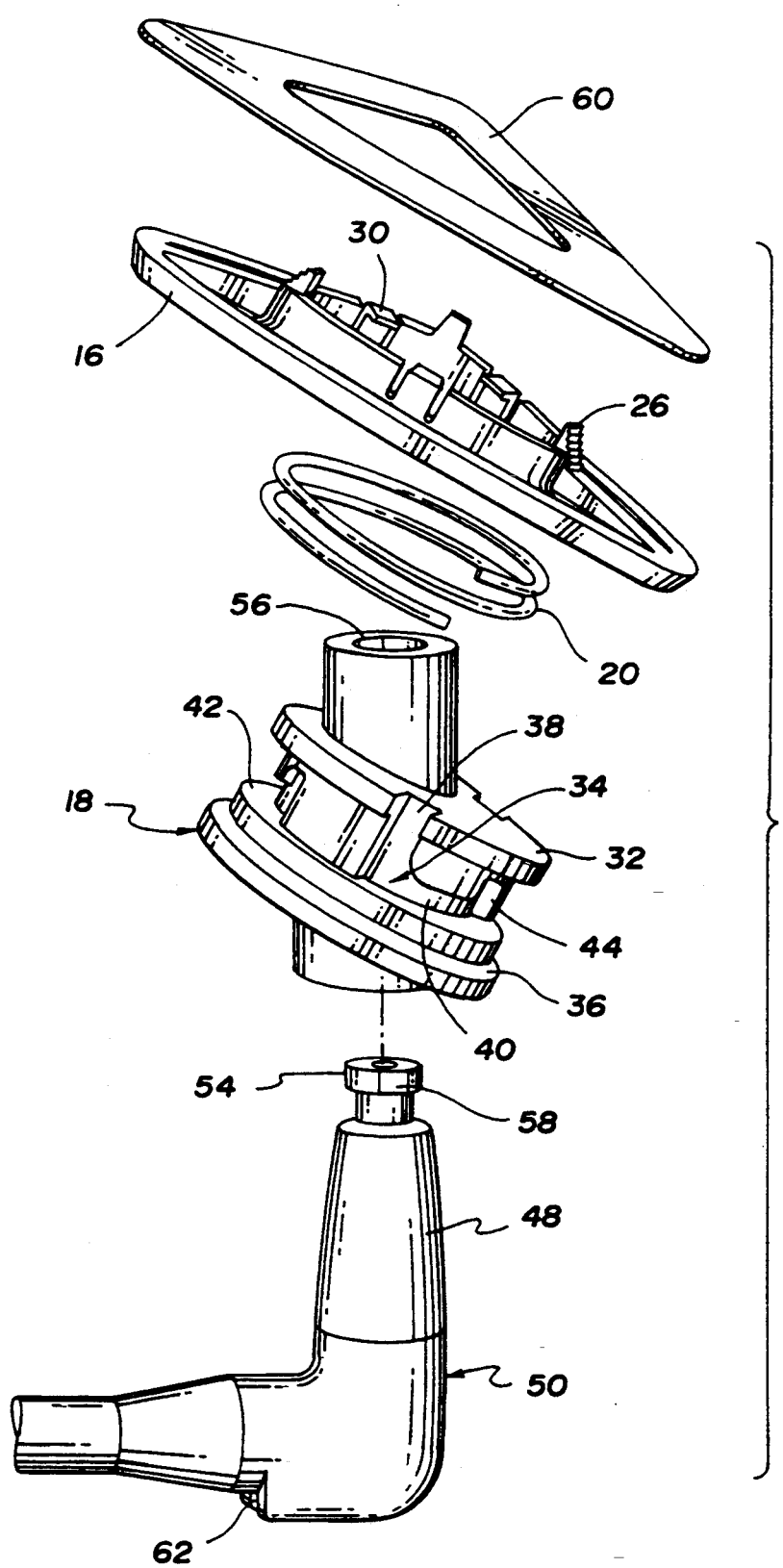
FIG. 4 is an exploded perspective view of an alternative embodiment of the assembly and a portion of a visor mounting arm.

FIG. 4 shows an alternative embodiment of the apparatus 10 which is adapted to be mounted to the headliner at a location not parallel to the horizontal. For this purpose, the flanges and channels of the arm receiver 18 are situated at the anticipated angle of the headliner so that the arm 48 of the visor pivot rod 50 will nevertheless depend generally vertically. This embodiment also shows a modified design of the knob 54 having only a single flattened surface 58, as well as a concealment channel 62 which is optionally provided in the pivot rod 50 through which a wire may be run for supplying electrical power to visor components such as a lighted vanity mirror.

While the best mode for carrying out the invention has been described in detail, those familiar with the art to which this invention relates will recognize various alternative designs and embodiments for practicing the invention as defined by the following claims.

What is claimed is:

1. An assembly for mounting a sun visor to the roof of a motor vehicle, the assembly comprising:

a frame having an opening therethrough, an anchor disposed on the perimeter of the frame opening and adapted to engage the roof, and a stop tab disposed on the perimeter of the frame opening;

an arm receiver having an upper flange adapted to be inserted through the frame opening, a channel adapted to receive the stop tab, and a lower flange; and a spring disposed between the frame and the arm receiver such that upon insertion of the upper flange of the arm receiver through the frame opening and rotation of the arm receiver about a central axis, the rotation stop tab enters the channel and is held therein to prevent the arm receiver from being withdrawn through the frame opening.

2. The assembly of claim 1 wherein the frame is generally triangular.

3. The assembly of claim 1 wherein the frame opening is generally triangular.

4. The assembly of claim 1 wherein a plurality of anchors are disposed around the perimeter of the frame opening.

5. The assembly of claim 4 wherein the anchors project generally upwardly from the perimeter of the frame opening.

6. The assembly of claim 4 wherein the anchors are adapted to extend through a hole in the vehicle roof.

7. The assembly of claim 1 wherein a plurality of stop tabs are disposed around the perimeter of the frame opening.

8. The assembly of claim 7 wherein the stop tabs project into the frame opening.

9. The assembly of claim 7 wherein a plurality of channels are formed in the arm receiver and adapted to receive a corresponding one of the plurality of stop tabs.

10. The assembly of claim 1 wherein the spring is disposed between the frame and the lower flange of the arm receiver.

11. The assembly of claim 1 wherein the arm receiver has a bore adapted to receive an arm of the sun visor.

12. The assembly of claim 11 wherein the arm of the sun visor includes means for retaining the arm in the bore.

13. The assembly of claim 12 wherein the means for retaining the arm comprises an irregularly shaped knob disposed at an upper end of the arm of the sun visor.

14. An assembly for mounting a sun visor to the roof of a motor vehicle, the assembly comprising:

a frame having an opening therethrough, a plurality of anti-rotation anchors disposed around the perimeter of the frame opening and adapted to engage the roof, and a plurality of rotation stop tabs disposed around the perimeter of the frame opening;

an arm receiver having an upper flange adapted to be inserted through the frame opening, a plurality of channel adapted to receive a corresponding rotation stop tab when the upper flange is inserted through the frame opening, a lower flange, and a bore adapted to receive an arm of the visor; and a spring disposed between the frame and the lower flange of the arm receiver, such that upon insertion of the upper flange of the arm receiver through the frame opening and rotation of the arm receiver about a central axis, the rotation stop tabs travel through their corresponding channels and are held therein to prevent the arm receiver from being withdrawn directly through the frame opening.

* * * * *

UNITED STATES PATENT AND TRADEMARK OFFICE
CERTIFICATE OF CORRECTION

PATENT NO. : 5,451,022
DATED : September 19, 1995
INVENTOR(S) : Donald Peterson

It is certified that error appears in the above-indentified patent and that said Letters Patent is hereby corrected as shown below:

On the Title page, item [73] Assignee should be changed from "Wayne State University" to "Plasta Fiber Industries Corporation."

Signed and Sealed this

Eleventh Day of June, 1996

Attest:

BRUCE LEHMAN

Attesting Officer  Commissioner of Patents and Trademarks